United States Patent [19]

Yamaguchi et al.

[11] 4,436,532
[45] Mar. 13, 1984

[54] PROCESS FOR CONVERTING SOLID WASTES TO GASES FOR USE AS A TOWN GAS

[75] Inventors: Katsunobu Yamaguchi, Yokohama; Seiichi Matsuoka, Anjyo; Takayuki Hayashida; Tomio Hayase, both of Yokohama, all of Japan

[73] Assignees: JGC Corporation; Tsukishima Kikai Co., Ltd., both of Tokyo, Japan; a part interest

[21] Appl. No.: 356,606

[22] Filed: Mar. 9, 1982

[30] Foreign Application Priority Data

Mar. 13, 1981 [JP] Japan .................................. 56-35303

[51] Int. Cl.$^3$ .............................................. C10J 3/00
[52] U.S. Cl. .................................. 48/209; 48/197 R; 48/214 A; 518/703
[58] Field of Search ...................... 48/209, 197 R, 210, 48/214; 518/703

[56] References Cited

U.S. PATENT DOCUMENTS

| | | | |
|---|---|---|---|
| 2,963,348 | 12/1960 | Sellers | 518/703 X |
| 2,987,387 | 6/1961 | Carkeek et al. | 518/703 X |
| 3,759,677 | 9/1973 | White | 48/209 |
| 3,853,498 | 12/1974 | Baillie | 48/209 |
| 3,890,113 | 6/1975 | Child et al. | 48/197 R |
| 4,064,156 | 12/1977 | McRobbie | 518/703 X |
| 4,082,520 | 4/1978 | Baron et al. | 518/703 X |
| 4,300,915 | 11/1981 | Schmidt et al. | 48/197 R |

FOREIGN PATENT DOCUMENTS 51-36201  3/1976  Japan ..................................... 48/209

Primary Examiner—Robert L. Lindsay, Jr.
Attorney, Agent, or Firm—Jordan and Hamburg

[57] ABSTRACT

A process for converting solid wastes to gases suitable for use as a town gas comprising the steps of (1) pyrolyzing solid wastes at 550° C. or higher in a pyrolyzing furnace to produce pyrolysis gases containing hydrogen, carbon monoxide and dioxide, methane and other hydrocarbons as well as chlorine-containing compounds, sulphur-containing compounds and other impurities, (2) washing the pyrolysis gases with an aqueous alkaline solution or the like, (3) refining the washed pyrolysis gases with the hydrogen contained in the pyrolysis gases, (4) reforming the refined pyrolysis gases by steam reforming, CO conversion and/or methanation and (5) separating the excess steam and carbonic acid gas from the reformed gases. In one embodiment, the washing (2) and refining (3) may be substituted by the high-temperature steam reforming of the pyrolysis gases in hot state supplied directly from the pyrolyzing furnace.

14 Claims, 2 Drawing Figures

PROCESS FOR CONVERTING SOLID WASTES TO GASES FOR USE AS A TOWN GAS

This invention relates to a process for converting gases produced by the pyrolysis of solid wastes to those suitable for use as a town gas. More particularly, it relates to such a process comprising pyrolyzing solid wastes to produce gases in such a manner that a large amount of nitrogen gas is not incorporated in the gases so produced, removing from the gases substantially all of harmful or impure substances, such as chlorine-containing compounds, sulfur-containing compounds, dienes and acetylene, contained therein, subjecting the substantially refined gases to at least one member selected from low temperature steam reforming, high temperature steam reforming, CO conversion and methanation and then subjecting the thus reformed gases to final treatments such as liquid-gas separation and/or carbon dioxide removal, thereby to obtain gases suitable for use as a town gas.

The presently prevalent means for the disposal of solid wastes typically include incineration and reclamation. The amount of solid wastes to be reclaimed is gradually decreased since the area of reclaimable lands has been decreasing and the amount thereof to be incinerated is accordingly increasing. Recently, in the case of disposal of solid wastes by incineration, excess heat is positively utilized from the view-point of the effective use of energy. However, such utilization of excess heat in the case of the incineration disposal is unavoidably limited since the excess heat can only be utilized in the form of steam or warmed water. For example, it is a general practice in the case of small-scale incineration plants that excess heat is recovered only in the form of warmed water to utilize the warmed water for their own uses; on the other hand, in the case of large-scale incineration plants, excess heat is recovered by a heat recovery boiler to evolve steam which is partly supplied to a steam turbine to generate electricity, partly used as the heat source for warmed water pools, welfare facilities (such as aged people's homes) and the like and/or partly supplied recently to collective residences (such as apartment houses) near the plants as the heat source for air heating or cooling in the collective residences. As seen in the above applications, every effort is contemplated in the recent plant installations to make effective uses of excess heat from incineration.

On the other hand, conventional incinerating methods have raised many kinds of problems because of the tightening of regulations for environmental pollution, the claims and demands by residents near the disposal plants and the tendencies of increase in calorific values of solid wastes to be disposed of. For these reasons, new methods comprising pyrolyzing solid wastes as a substitute for the conventional methods comprising incineration, are now being developed and put to practical use.

The disposal of solid wastes by pyrolysis is advantageous in that:

(1) harmful oxides (such as nitrogen oxides ($NO_x$), sulfur oxides ($SO_x$) and hexachromium compounds) are produced is a small quantity and, further, the concentration of hydrogen chloride in the smoke produced by the pyrolysis is low, whereby the pyrolysis disposal promises less environmental pollution which may be dealt with more easily, (2) the ignition loss of residue produced by the pyrolysis is very little, the recovery ratio of metals from the wastes is high and the residue is easy to make the effective use of, thereby enabling it to exploit the wastes as resources and (3) the gases produced by the pyrolysis are combustible gases containing hydrocarbons and may be used as fuel.

The disposal by pyrolysis is highly evaluated since it causes less environmental pollution and it enables solid wastes to be utilized as resources. Pyrolysis is the conversion of high molecular weight compounds to low molecular weight ones and in the case of pyrolysis of solid wastes, it is a function of pyrolysis temperatures how low molecular weight compounds are produced. Generally speaking, it is suitable to select a pyrolyzing temperature of 400°–550° C. for the purpose of recovering liquid fuel (tars) and a pyrolyzing temperature of at least 550° C. for producing gaseous fuel. Tars produced from solid wastes, particularly cellulosic wastes, are very unstable, will produce floating solids and have intense offensive odor thereby considerably limiting their use without pretreatments against the odor. In contrast, gases produced by pyrolyzing solid wastes may be made considerably clean only by washing and, therefore, such gases can be easily used as fuel as compared with such tars.

Because of recent shortage of energy, there has pervaded an idea that solid wastes are utilized as fuel. Conventional methods of using solid wastes as fuel include:

(1) a method of using solid wastes as solid fuel comprising crushing the solid wastes, separating the incombustibles from the thus crushed wastes as far as possible to allow the remaining wastes to exhibit enhanced temperatures when burnt, and burning the remaining wastes, (2) a method of using solid materials as liquid fuel comprising pyrolyzing solid wastes at low temperatures, recovering the liquid fuel, that is tars, in a good yield and then burning the thus recovered liquid fuel, (3) a method of using solid wastes as gaseous fuel comprising pyrolyzing the solid wastes at high temperatures to produce gases and burning the thus produced gases, and (4) a method of using solid wastes as gaseous fuel comprising sorting the solid wastes to obtain the organic materials, subjecting the thus obtained organic materials to methane fermentation and burning the resulting methane.

If solid wastes are evaluated from the view-point of fuel, they will be regarded as a low-class fuel since they have the following disadvantages:

(1) they contain incombustibles and water in large proportions thereby reducing their calorific value, (2) they contain nitrogen, chlorine and sulfur which will be the cause for producing harmful gases when burnt and (3) they have an irregular and indefinite form and are composed of a great variety of substances.

However, once solid wastes are converted to gases or liquids to be used as fuel, the gases or liquids are changed to a high-class fuel by refining them to enhance their calorific value, get them clean and make them an easy-to-handle fuel. The liquid fuel, that is tar, is awkward to handle as fuel since it produces such troublesome floating solids as previously mentioned. For this reason, there have been developed many methods comprising pyrolyzing solid wastes at a high temperature of at least 550° C. to convert to gases and recovering the gases as fuel. The gases produced by the pyrolysis of solid wastes may be easily refined only by washing, find wide uses and will be used as heat energy at a high efficiency when used. Therefore, gases obtained by refining gases produced by the pyrolysis of solid wastes at a temperature of at least 550° C. may be effectively used as gaseous fuel; further, if the gases so refined are treated to a higher extent, then the thus more highly treated gases, that was the potential energy owned by the wastes, may be used as a town gas for example.

Generally speaking, gases produced by the pyrolysis of solid wastes are composed mainly of hydrogen, carbon monoxide, carbonic acid gas, methane and $C_2$ and higher hydrocarbons as well as inert gases and a small amount of impurities such as chlorine-containing compounds, sulfur-containing compounds and ammonia.

Such gases produced by the pyrolysis of solid wastes are disadvantageous for use as fuel without refining them, as illustrated hereinbelow:

(1) The gases contain many harmful ingredients such as CO, sulfur-containing compounds and chlorine-containing compounds, (2) They are likely to produce gummy substances in gas conduits and at gas burners and other portions when passed therethrough since they contain olefins, dienes, acetylene and the like in a substantial amount, and the gummy substances so produced tends to cause coking when heated and (3) They are low in calorific value and high in combustion velocity.

In the conventional steam reforming of LPG or naphtha as the raw material, the sulfur-containing compounds contained in the raw material will act as catalytic poison and, therefore, it is a general practice to effect hydrodesulfurization (desulfurization by hydrogenation) on the sulfur-containing compounds in order to eliminate them; however, if the conventional hydrofining is adopted in the refining of pyrolysis gases obtained from solid wastes, then methanation will additionally take place due to the coexistence of carbon monoxide and carbonic acid gas in the gases produced by the pyrolysis of solid wastes (these gases being hereinafter sometimes referred to as "pyrolysis gases" for brevity), thereby remarkably raising the temperature of the system due to the reaction heat of the methanation and consequently exerting adverse influences on said hydrodesulfurization, this being disadvantageous.

Further, the pyrolysis gases contain so large a proportion of olefins as is likely to cause carbon deposition in the subsequent steam reforming thereof. Still further, if the pyrolysis gases are hydrodesulfurized in the conventional manner to reduce the olefins in content, then the olefins will be likely to react with hydrogen thereby generating remarkable heat.

In these respects, neither the conventional steam reforming nor conventional preliminary treatment of the pyrolysis gases is possible to get the gases to meet the requirements for use as a town gas.

The present inventors have found that a process comprising, as the reforming means, at least one of low-temperature steam reforming, high-temperature steam reforming, CO conversion and methanation steps, is one which eliminates the aforesaid drawbacks of the pyrolysis gases as produced and may produce gases having desired properties.

Figure 1:
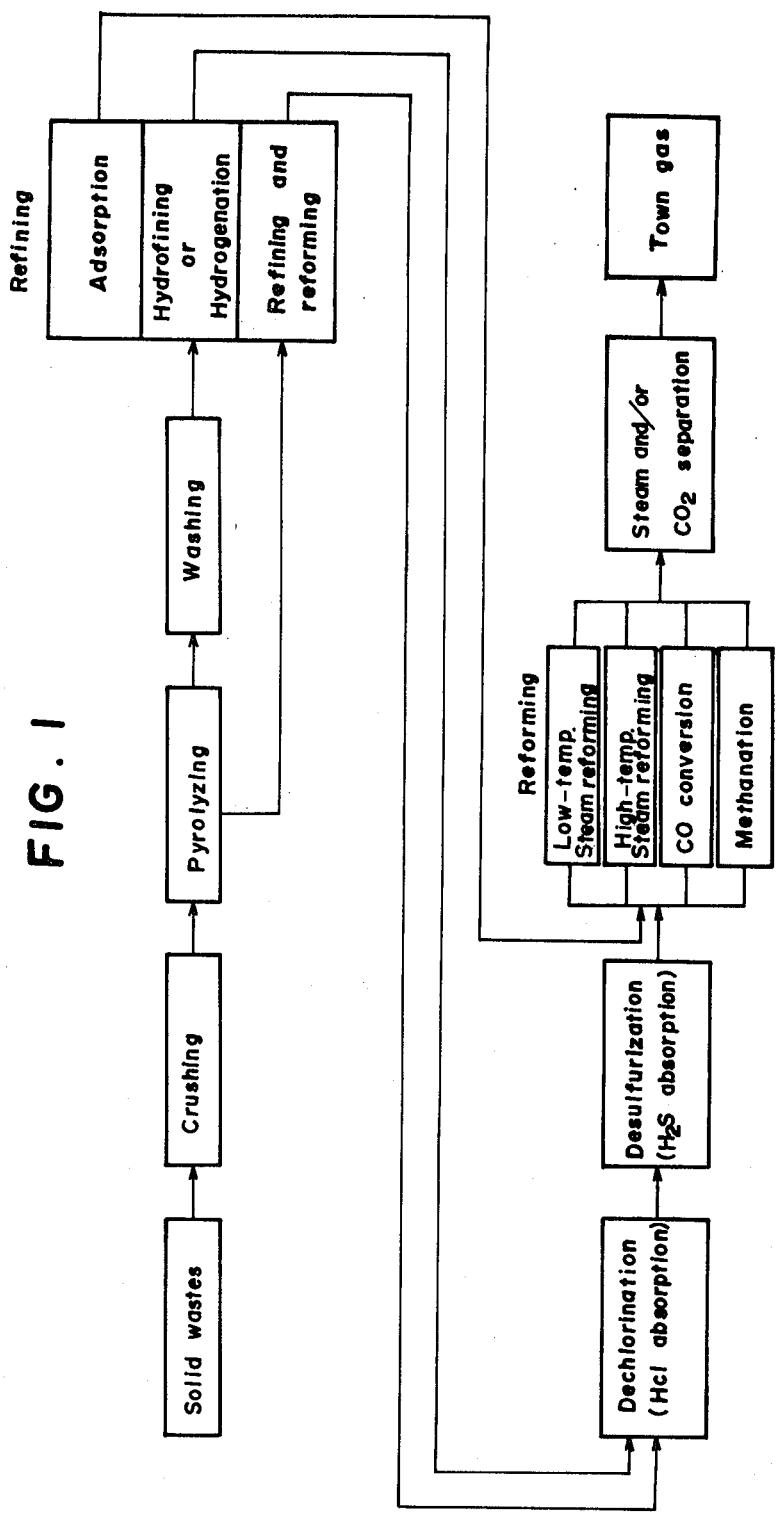
FIG. 1 is a flow diagram showing the process of the present invention.

More particularly, as is shown in FIG. 1, the process of the present invention comprises the steps of pyrolyzing solid wastes at a temperature of at least 550° C. to produce a gaseous mixture (or pyrolysis gases) containing hydrogen, carbon monoxide, carbonic acid gas, hydrocarbons such as methane, inert gases, and impurities such as chlorine-containing compounds and sulfur-containing compounds, washing the thus produced gas mixture, either refining the thus washed gas mixture by hydrogenating with the hydrogen contained therein followed by removing the resulting hydrogen chloride, hydrogen sulfide and the like from the hydrogenated gas mixture or refining said washed gas mixture by adsorbing with adsorbents, subjecting the thus refined gas mixture to at least one treatment selected from low-temperature steam reforming, high-temperature steam reforming, CO conversion and methanation and then, if desired, separating the steam and/or carbonic acid gas from the thus treated gas mixture thereby to obtain a desired gas mixture suitable for use as a town gas.

The conversion of the pyrolysis gases to a town gas according to this invention may be attained by selective combined use of said various steps. Said desired gas mixture may be increased in calorific value, diluted with air or treated in other ways for use as a town gas.

The pyrolysis as the first step of the process of this invention may preferably be effected as described hereinbelow.

In cases where solid wastes having a low calorific value are used, the pyrolysis thereof may be effected by the following method (1) or (2):

(1) Indirect heating methods including a dual fluidized-bed method (Japanese Pat. No. 871982) using a pyrolyzing furnace and a combustion furnace supplying thereto heat for pyrolysis, and (2) Partial combustion methods using oxygen.

In cases where solid wastes used have a high calorific value, the pyrolysis may be effected not only by each of said methods (1) and (2) but also by a partial combustion method (3) using air.

The pyrolysis may preferably be effected at a temperature of at least 550° C.

The pyrolysis gases comprise as the main ingredients hydrogen, carbon monoxide, carbonic acid gas, methane, ethane, ethylene, propylene, butadiene, butane and the like and also comprise as the harmful gases a small amount of hydrogen chloride, ammonia, hydrogen sulfide and hydrogen cyanide. For example, pyrolysis gases obtained from solid wastes such as municipal ones, the harmful gases generally comprise 1,000–3,000 ppm of hydrochloric acid, 1,000–1,500 ppm of methyl chloride, 6,000–12,000 ppm of ammonia, 6,000–8,000 ppm of hydrogen sulfide and 300–600 ppm of hydrogen cyanide.

The pyrolysis gases are washed to remove such harmful gases therefrom by the use of one or more scrubbers. It is desirable to use two scrubbers arranged in series (the first and second scrubbers) in order to wash usual pyrolysis gases. The washing liquids used herein may be water and other various solvents, however, a washing method using a condensate may be preferably used in the practice of this invention. The term "condensate" used herein is intended to mean a liquid obtained by cooling gases containing condensable ingredients composed mainly of steam to condense the condensable ingredients. In cases where such a condensate is used as a washing liquid after having been cooled, the gases to be washed are gradually cooled as the washing proceeds to produce a condensate therefrom. The condensate so produced is fed back to the scrubbers for use as a supplementary washing liquid while an excess of the washing liquid is discharged from the system whereby the washing may be satisfactorily effected without being accompanied by insufficiency of the amount of the washing liquid used and production of the waste washing liquid in a large amount.

Washing of the pyrolysis gases with the condensate by the use of the two scrubbers arranged in series will be illustrated hereinbelow.

The pyrolysis gases are washed at a pH value of 8–9 in the first scrubbing step and then at a pH of 10–11 in the second scrubbing step whereby the harmful gases contained in the pyrolysis gases are lessened as follows:

Hydrochloric acid is reduced to 10–30 ppm, methyl chloride to 1,000–1,500 ppm, ammonia to 1–10 ppm, hydrogen sulfide to 2,000–4,000 ppm and hydrogen cyanide to 0.1 ppm or less.

The pyrolyzing temperature is related to the composition and properties of a condensate produced and the use of a pyrolyzing temperature of 650°–900° C. will result in the production of a condensate having a pH value of 8–9 which is suitable for use as a washing liquid.

The pyrolysis gases so washed may be stored in a gas holder if desired or a part thereof may be returned to the pyrolyzing step as a supplementary fuel. The washed gases may then be passed to an oil-washing step after or without being pressurized, if desired. The gases from the oil-washing step contain not only hydrochloric acid but also methyl chloride as chlorine-containing compounds in the total amount of about 1,000–1,500 ppm and also contain a trace of other organochloric compounds in cases where they are those derived from usual solid wastes such as municipal ones. As for the sulfur-containing compounds, said gases from the oil-washing step contain about 100–1000 ppm of organosulfuric compounds in addition to hydrogen sulfide. In the oil-washing step, tarry materials contained in the gases are contacted with an oil such as kerosene thereby to be removed therefrom. The oil which absorbed the tarry materials may be used as a supplementary fuel in the pyrolyzing step.

The gases so oil-washed are then supplied to a hydrofining or hydrogenating step after or without the desulfurization thereof. The desulfurization, that is the removal of hydrogen sulfide ($H_2S$), may be carried out using an adsorbent such as iron oxide, zinc oxide, silica or the like.

The harmful compounds, such as chlorine-containing compounds and sulfur-containing compounds, still remaining in the gases from the washing step may be further removed by adsorbing, hydrogenating or hydrofining. The contents of the chlorine-containing compounds and sulfur-containing compounds may thus be reduced respectively to 1 ppm or less if desired.

In addition, as previously mentioned, olefins, dienes, acetylene and the like contained in the pyrolysis gases are likely to form gummy substances in gas conduits, gas burners and the like through which they are passed, and they are also likely to cause coking when heated.

To eliminate the troubles which are likely to be caused by the still remaining harmful compounds and polymerizable substances such as olefins, the previously mentioned adsorbing, hydrofining or hydrogenating means according to this invention may preferably be used.

First of all, the adsorbing means will be detailed hereinbelow.

The chlorine-containing compounds and sulfur-containing compounds are well adsorbed by activated carbon for adsorbing low-boiling ingredients and, simultaneously with this, the high-boiling hydrocarbons contained in the wash pyrolysis gases are also adsorbed thereby. For this reason, the sole use of only activated carbon for low-boiling ingredients will not meet the necessary adsorbing capacity and will therefore not be feasible. The present inventors made studies to solve the problem so raised and found that the pyrolysis is effected at the higher temperature side within a suitable temperature range (at least 550° C., preferably 550°–900° C. for example) to decrease the amount of high-boiling ingredients produced and that the pyrolysis gases are passed firstly through an activated carbon layer for adsorbing high-boiling ingredients to adsorb the high-boiling ingredients and then passed through an activated carbon layer for low-boiling ingredients to adsorb the chlorine- and sulfur-containing compounds, whereby said problem is solved. By using this absorbing means, substantially all of the chlorine- and sulfur-containing compounds may be removed at a great adsorbing capacity. In addition, it was found that the activated carbons are not reduced in adsorbing capacity even if they are repeatedly regenerated and reused. The activated carbon used herein for adsorbing high-boiling ingredients is one having a cumulative pore volume of up to 0.3 cc/g (the pores for the cumulative pore volume being those having a pore diameter of up to 15 Å as determined from the methanol adsorption method), while the activated carbon used herein for adsorbing low-boiling ingredients is one having a cumulative pore value of at least 0.35 cc/g. As is seen from the above, the low-boiling ingredients as defined herein include chlorine-containing compounds and sulfur-containing compounds, while the high-boiling ingredients as defined herein include high-boiling hydrocarbons ($C_3$ or higher hydrocarbons for example).

The hydrofining or hydrogenating means used herein will be detailed hereinbelow.

The chlorine-containing compounds and sulfur-containing compounds as the impure or harmful substances as well as the polymerizable hydrocarbons contained in the washed pyrolysis gases, are hydrogenated with the hydrogen contained in said pyrolysis gases at a temperature of 100°–500° C. and a pressure of atmospheric to 50 $Kg/cm^2G$ to form hydrogen chloride (HCl), hydrogen sulfide ($H_2S$) and saturated hydrocarbons, respectively.

Hydrofining or hydrogenating catalysts generally include nickel-based, nickel.molybdenum-based and cobalt.molybdenum-based catalysts, however, these catalysts are said to usually cause methaation thereby incurring troubles when used in the coexistence of CO and $CO_2$. The present inventors obtained information that the use of said catalysts which have been sulfided enables the hydrogenation without causing methanation. Thus, in this invention, the unsaturated hydrocarbons, organosulfuric compounds and organochloric compounds contained in the washed pyrolysis gases are hydrogenated even in the coexistence of CO and $CO_2$ without causing methanation of the CO and $CO_2$ by using the nickel, nickel.molybdenum- or cobalt.molybdenum-based catalyst in the sulfided form.

The hydrogen chloride and hydrogen sulfide produced by the hydrogenation are then removed by a chemical absorption method. Hydrogen chloride may be absorbed by calcium carbonate ($CaCO_3$) or the like as the absorbent and hydrogen sulfide may be absorbed by an amine compound, potassium carbonate ($K_2CO_3$) or the like as the absorbent. Further, in cases where a steam reforming step follows, the hydrogen chloride and hydrogen sulfide still remaining in the pyrolysis gases so far treated are absorbed and removed by zinc oxide, silica or other suitable adsorbents or a combination thereof to an extent that the harmful compounds are reduced in concentration to below the level at which steam reforming catalysts are tolerable.

The hydrofining or hydrogenation according to this invention may also be effected in two steps, if desired, as detailed hereinbelow.

The washed pyrolysis gases are supplied to the first hydrogenating step after or without desulfurization thereof. The desulfurization, that is removal of hydrogen sulfide ($H_2S$), may be effected with a known absorbent such as an iron oxide, zinc oxide or silica type compound, at ambient temperature as previously stated.

The first step hydrogenation is carried out with the hydrogen contained in the washed pyrolysis gases at 120° C. or higher and at atmospheric pressure to 50 $Kg/cm^2G$ in a case where the desulfurization is not effected prior to the hydrogenation, while it is carried out at 60° C. or higher and at atmospheric pressure to 50 $Kg/cm^2G$ in a case where the desulfurization is effected prior to the hydrogenation. Even if pyrolysis gases containing an increased amount of unsaturated hydrocarbons are produced depending on the kind of solid wastes used and the pyrolyzing conditions, these unsaturated hydrocarbons are hydrogenated in the first hydrogenating step whereby troubles such as coking thereof is eliminated in the subsequent steps. The gases from the first hydrogenating step are passed to the second hydrogenating step wherein the chlorine-containing compound, sulfur-containing compounds and olefins contained in the gases are hydrogenated with the hydrogen contained therein at 200°–500° C. and at atmospheric pressure—50 $Kg/cm^2G$ thereby to be converted respectively to hydrogen chloride (HCl), hydrogen sulfide ($H_2S$) and saturated hydrocarbons. The catalysts which may preferably be used in the first hydrogenating step include palladium-based, platinum-based and ruthenium-based catalysts, while the preferable catalysts used in the second hydrogenating step include nickel-based, nickel.molybdenum-based and cobalt.molybdenum-based catalysts.

The hydrogen chloride and hydrogen sulfide are absorbed and removed in the subsequent chemical absorption step. The non-absorbed portions of these harmful compounds which are not removed by chemical absorption are then further removed by using zinc oxide, alumina and silica type absorbents singly or in combination to below a level that catalysts for use in the subsequent steam reforming step will tolerate as mentioned before.

The two-step hydrofining or hydrogenation is particularly effective in preventing the occurrence of coking and avoiding the state in which the hydrodesulfurization and dechlorination of pyrolysis gases are made difficult in a hydrofining step in cases where the pyrolysis gases contain dienes and/or acetylene in a comparatively large proportion depending on the kind of solid wastes pyrolyzed and the pyrolyzing conditions selected.

It should be noted that the aforesaid washing and hydrofining or hydrogenating steps may be substituted by a high-temperature steam reforming step carried out soon after the pyrolysis of solid wastes. The use of the substituted high-temperature steam reforming is advantageous for producing refined and reformed pyrolysis gases economically efficiently since pyrolysis gases are produced at a high temperature of 550° C. or higher and contain steam and the gases in a high steam-gases ratio by volume of about 3:1, while it is very uneconomical from the view-point of heat energy that pyrolysis gases which are at such a high temperature and contain steam and the gases in such a high steam-gases ratio as above are once cooled and then heated again in a refining step such as hydrofining or hydrogenating step. It is considered in the substituted high-temperature steam reforming step that the starting pyrolysis gases (directly from the pyrolyzing furnace) at a high temperature of 550° C. or higher are subjected to high-temperature steam reforming thereby to increase hydrogen, hydrofine the harmful compounds (such as chlorine- and sulfur-containing compounds) in the starting gases, hydrogenate the dienes and acetylene therein and reform the gases. The hydrogen chloride and hydrogen sulfide are then removed as previously mentioned.

The substituted high-temperature steam reforming used herein include continuous type high-temperature steam reforming, cyclic type high-temperature steam reforming and partial oxidation type high-temperature steam reforming.

The pyrolysis gases so refined by the various means (washing, adsorption by activated carbon, one-step or two-step hydrogenation or hydrofining and chemical absorption) are subjected to at least one treatment selected from the group consisting of low-temperature steam reforming, CO conversion, high-temperature steam reforming and/or methanation, depending on the requirements for a town gas sought, to obtain reformed gases which are then subjected to final treatments such as separation of the steam and carbonic acid gas thereby to obtain desired gases for use as a town gas. The reforming and final treatments may be effected in the following various ways as required.

(1) The pyrolysis gases so far refined are subjected to low-temperature steam reforming to form methane-rich gases from which the steam is then separated by condensation, to obtain a town gas;

(2) They are subjected to CO conversion to decrease the CO concentration thereof and then freed of the steam by condensation, to obtain a town gas;

(3) They are subjected to high-temperature steam reforming to obtain hydrogen-rich gases from which the steam is then separated by condensation, to obtain a town gas;

(4) They are subjected to said treatments (1) and (2), methanated prior to separation of the steam and then separated from the steam to obtain a town gas;

(5) They are subjected to said treatments (1), (2) and (3), after which they are decarbonated (freed of the $CO_2$) to obtain a town gas;

(6) They are subjected to said treatments (1)–(4), after which they are decarbonated to obtain a town gas;

(7) They are subjected to said treatment (3) and then to CO conversion prior to separation of the steam, after which the steam is separated from them to obtain a town gas; or (8) The gases obtained in each of said (1)–(7) are incorporated with a part of said refined gases bypassed, thereby to obtain a town gas.

In the reforming step, it is preferable that the low-temperature steam reforming be carried out at 300°–600° C., the high-temperature steam reforming at 400°–850° C., the CO conversion at 200°–550° C. and the methanation at 250°–600° C.

This invention will be better understood by the following examples and comparative examples.

EXAMPLE 1

This Example will be explained with reference to FIG. 2 as follows.

Pyrolyzing step

Solid wastes, such as municipal ones, having a composition as shown in Table 1 were pyrolyzed in a dual fluidized-bed type pyrolyzing furnace (indirect heating system) 1 consisting of a pyrolyzing furnace 2 and a combustion furnace 3, which were each a deep fluidized-bed furnace and were connected together by circulation pipes 4 and 5. The fluid medium was silica sand in this case and circulated through the circulation pipes 4 and 5 from the combustion furnace 3 to the pyrolyzing furnace 2 and vice versa with aid of a gas blown into the furnaces 2 and 3 at the bottoms 6 and 7 respectively. The solid wastes charged into the pyrolyzing furnace 2 through a line 8 were pyrolyzed to produce pyrolysis gases which were then passed through a line 9A to a washing step using two scrubbers 13 and 18 therein. On the other hand, the silica sand and carbon deposited in the pyrolyzing furnace were together introduced from the pyrolyzing furnace 2 into the combustion furnace 3 where the carbon was burned with air supplied through lines 10 and 11 and, if necessary, a supplementary fuel supplied through a line 12. The silica sand heated in the combustion furnace was again supplied to the pyrolyzing furnace 2 through the pipe 5. Such a dual fluidized-bed type pyrolyzing furnace 1 is already known (Japanese Patent No. 871982).

The pyrolyzing furnace 2 used in this Example was 2 m in the maximum inner diameter and 13.7 m in height. The solid wastes having a composition as shown in Table 1 were supplied to the pyrolyzing furnace 2 at a supply rate of 981 Kg/hr and then pyrolyzed at 700° C. therein. The pyrolysis gases thus obtained were passed through the line 9A to the washing step.

TABLE 1

| Wood chips | 3.2 wt. % | Metals | 2.3 wt. % |
|---|---|---|---|
| Fibers | 2.3 wt. % | Glass, sand | 0.8 wt. % |
| Paper | 46.4 wt. % | Leather, rubber | 0.1 wt. % |
| Rubbish | 38.1 wt. % | Plastics | 6.3 wt. % |
| | | Lower calorific value | 1217 Kcal/Kg |

Washing step

The pyrolysis gases were passed through the line 9A to a first scrubber 13 where they were contacted with a liquid condensate supplied from a tank 14 through a cooler 15 and a line 17 thereby to wash and cool them. At this time, the condensate was maintained at a suitable pH of 8–9 without adding an alkali thereto. The pyrolysis gases so washed were passed through a line 21 to a second scrubber 18 to further wash and cool them. In this case, the condensate in a tank 19 was incorporated with a 5% aqueous solution of sodium hydroxide supplied through a line 20 to adjust the pH value thereof to 10–11. An excess of the condensate produced by cooling was discharged through a line 22 from the system.

The pyrolysis gases so further washed were passed to the subsequent adsorbing step.

In case where the washed pyrolysis gases contain hydrogen sulfide in a considerable amount, there may be employed a wet type desulfurizing method (Taka-hacks method) using therein sodium 1-4-naphthoquinone-2-sulfonate as the redox catalyst. The gases from the washing step were obtained at a flow rate of 236 Nm$^3$/hr and had a gross calorific value and composition as indicated in Table 2.

TABLE 2

| | | | |
|---|---|---|---|
| $H_2$ | 24.76 vol. % | $N_2$ | 2.59 vol. % |
| CO | 31.50 vol. % | $H_2S$ | <10 ppm |
| $CO_2$ | 16.75 vol. % | HCl | <10 ppm |
| $CH_4$ | 13.62 vol. % | $NH_3$ | <10 ppm |
| $C_2H_4$ | 6.51 vol. % | HCN | <10 ppm |
| $C_2H_6$ | 0.89 vol. % | R—SH | <0.1 vol. % |
| $C_3H_6$ | 1.62 vol. % | R—Cl | 7000 ppm |
| $C_4H_8$ | 0.83 vol. % | | |
| $C_4H_{10}$ | 0.53 vol. % | | |
| | | Gross calorific value | 4886 Kcal/Nm$^3$ |

The impurities had been almost removed as indicated in Table 2, however, remaining chlorine-containing compounds and sulfur-containing compounds were required to be removed to an extent that the gases from the scrubber 18 were no more harmful to a catalyst used in the subsequent low-temperature steam reforming step; for this reason, the gases from the scrubber 18 were passed to the following refining towers 32A and 32B (these being used as the adsorbing towers in this Example).

Adsorbing step

The gases having the composition shown in Table 2 were passed to the refining tower 32A and then to the refining tower 32B at a flow rate of 5000 Nl/hr, the towers being alternately used. The adsorbing towers were each packed at the upper part with 3.3 Kg. of activated carbon for adsorbing high-boiling ingredients and at the lower part with 3.6 Kg of activated carbon for adsorbing low-boiling ingredients. When the gases were passed through the tower 32A, those freed of the chlorine- and sulfur-containing compounds were obtained from a line 34A at a flow rate of 4800 l/hr. When one ppm of the chlorine-containing compounds was detected at the gas outlet of the tower 32A 155 minutes after commencement of the adsorption, the incoming gases were switched to the other tower 32B by means of changeover of valves. Even at this time, none of the sulfur-containing compounds were detected in the gases from the tower 32A. Then, steam was supplied through a line 46 to the adsorbing tower 32A to regenerate both the activated carbon layers, while the resulting desorbed gases and steam were discharged through a line 34C. The adsorbing capacity of the used adsorbents were recovered by the regeneration and they hardly changed in adsorbing capacity although adsorption-regeneration thereof were repeated 27 times. In addition, the breakthrough time of the adsorbents at the time of their 27th-time use was 158 minutes.

The gases after the adsorption had a composition as shown in Table 3.

TABLE 3

| | | | |
|---|---|---|---|
| $CH_4$ | 14.2 vol. % | $N_2$ | 2.5 vol. % |
| $C_2H_4$ | 6.7 vol. % | R—SH | Trace |
| $C_2H_6$ | 0.9 vol. % | R—Cl | Trace |
| $H_2$ | 25.7 vol. % | | |
| CO | 32.6 vol. % | | |

TABLE 3-continued

| | |
|---|---|
| $CO_2$ | 17.2 vol. % |

A loss of the gases incurred in this adsorbing step was about 4% by volume, based on the volume of the gases supplied to this step.

The high-boiling ingredients referred to herein usually include $C_3H_6$, $C_4H_8$ and $C_4H_{10}$, and the low-boiling ingredients usually include $HCl$, $H_2S$, $NH_3$, $HCN$, R—SH and R—Cl.

Low-temperature steam reforming step

The gases having the composition as indicated in Table 3 were passed through the line 34C at a flow rate of 4800 Nl/hr to a compressor (not shown) to pressurize them to 15 Kg/cm$^2$G, after which the pressurized gases were passed to a heating furnace (not shown) to heat them to 350° C., incorporated with steam supplied from a line 46 at a flow rate of 14.6 Kg/hr, again heated in another heating furnace (not shown) and then fed to a reforming tower 47A (low-temperature steam reforming being effected by using an adiabatic fixed bed reactor containing 2.4 Kg of a Ni-Al$_2$O$_3$ catalyst in this Example) where they were contacted with catalyst for low-temperature steam reforming thereby to obtain reformed gases.

The main operating conditions and the results are as shown in Table 4.

TABLE 4

| | |
|---|---|
| Reaction pressure: 14 Kg/cm$^2$G | |
| Temp. at inlet of reactor: 350° C. | |
| Temp. at outlet of reactor: 500° C. | |
| Reformed gases obtained: | |
| flow rate of the reformed gases: 5950 l/hr | |
| composition: | |
| $CH_4$ | 23.7 vol. % |
| $H_2$ | 34.0 vol. % |
| CO | 0.9 vol. % |
| $CO_2$ | 39.2 vol. % |
| $N_2$ | 2.2 vol. % |
| Flow rate of unreacted steam: 13.4 Kg/hr | |

The steam reforming could be continuously carried out without carbon deposition on the catalyst.

Finishing treatment (steam separation) step

The gases from the steam reforming tower 47A were cooled by a cooler 50 to condense the unreacted steam and then passed to a gas-liquid separator 61 from which gases having the following composition shown in Table 5 were obtained at a flow rate of 5950 Nl/hr.

TABLE 5

| | |
|---|---|
| $CH_4$ | 23.7 vol. % |
| $H_2$ | 34.0 vol. % |
| CO | 0.9 vol. % |
| $CO_2$ | 39.2 vol. % |
| $N_2$ | 2.2 vol. % |

EXAMPLE 2

The procedure of Example 1 was followed except that low-temperature steam reforming was effected in two steps using two steam reforming towers arranged in series.

The main operating conditions in the two-step steam reforming and the results are as indicated in Table 6.

TABLE 6

Amount of steam supplied: 14.6 Kg/hr
Amount od gases supplied: 4800 Nl/hr

TABLE 6-continued

Amount of gases supplied to first step-up reactor: 2350 Nl/hr
Temperature of gases supplied to first step-up reactor: 350° C.
Temperature of reformed gases from first-step reactor: 500° C.
Amount of gases supplied to second-step raector: 2400 Nl/hr
Temperature of gases supplied to second-step reactor: 350° C.
Temperature of further reformed gases from second-step reactor: 515° C.
Preesure: 12.5 Kg/cm$^2$G
Product gases:

| | | |
|---|---|---|
| flow rate | 5330 Nl/hr | |
| composition | $CH_4$ | 29.3 vol. % |
| | $H_2$ | 26.3 vol. % |
| | CO | 1.6 vol. % |
| | $CO_2$ | 40.4 vol. % |
| | $N_2$ | 2.4 vol. % |

It was appreciated by visual observation after the end of the experiment that no carbon was deposited on the catalysts in the first-step and second-step reactors.

COMPARATIVE EXAMPLE 1

The procedure of Example 1 was followed except that the adsorbing towers were each charged with 7 Kg of activated carbon for high-boiling ingredients.

The gases having the composition shown in Table 2 were passed through one of the towers to obtain desulfurized gases having a composition as shown in Table 7. When one ppm of the chlorine-containing compounds was detected at the outlet of the tower 190 minutes after commencement of the adsorption, the gases were switched into the other adsorbing tower by changeover of the valves.

The used activated carbon in the former tower was attempted to be regenerated with steam supplied thereto. On the other hand, the breakthrough time was gradually decreased every time the adsorption and regeneration were alternately repeated, and the breakthrough time at the time of its 27th-time use was decreased to 90 minutes.

In the case of Example 1 the adsorbing capacity and breakthrough time did not change even if the adsorption-regeneration cycle was repeated 27 times, and the latter for its 27-th time use was 158 minutes. This clearly indicates that the combined use of two types of adsorbents for adsorbing the low- and high-boiling ingredients as in Example 1 is very advantageous as compared with the single use of adsorbent for adsorbing the low-boiling ingredients as in this Comparative Example since the latter will not allow the adsorbent to be kept active for a long time when used. The gases from the adsorbing tower in this Comparative Example had a composition as shown in Table 7.

TABLE 7

| | | | |
|---|---|---|---|
| $CH_4$ | 14.1 vol. % | CO | 32.6 vol. % |
| $C_2H_4$ | 6.7 vol. % | $CO_2$ | 17.4 vol. % |
| $C_2H_6$ | 0.9 vol. % | $N_2$ | 2.7 vol. % |
| $H_2$ | 25.6 vol. % | | |

The activated carbon for adsorbing low-boiling ingredients used in this Comparative Example was the same as that used in Example 1.

EXAMPLE 3

This Example will be explained with reference to the flow chart of FIG. 2.

The pyrolyzing and washing procedures of Example 1 were followed, to obtain washed pyrolysis gases at a flow rate of 240 Nm³/hr. The gases so obtained had a composition as shown in Table 8.

TABLE 8

| Composition of washed gases | | | |
|---|---|---|---|
| $H_2$ | 24.8 vol. % | $C_4H_8$ | 0.8 vol. % |
| CO | 31.5 vol. % | $C_4H_{10}$ | 0.5 vol. % |
| $CO_2$ | 16.7 vol. % | $N_2$ | 2.7 vol. % |
| $CH_4$ | 13.6 vol. % | $H_2S$ | 0.2 vol. % |
| $C_2H_4$ | 6.5 vol. % | RSH | 0.1 vol. % |
| $C_2H_6$ | 0.9 vol. % | HCl | <100 ppm |
| $C_3H_6$ | 1.6 vol. % | RCl | 0.1 vol. % |
| $C_3H_8$ | <0.1 vol. % | | |

The thus obtained washed pyrolysis gases were stored in a gas holder 24, pressurized by a compressor 25 and passed through a buffer drum 26 to an oil washing tower 27 where they were further washed with kerosene 29. The thus further washed pyrolysis gases were preheated by a heater 31 and passed to a refining tower (this tower being used as the hydrofining tower in this Example) 32A (or 32B) packed with a hydrofining catalyst (cobalt.molybdenum-based), at a SV (space velocity) of 2000 HR$^{-1}$ (SV value in the normal state, this being applied to the following Examples). The hydrogenation was carried out at a temperature of 300° C. and a pressure of 16 Kg/cm²G thereby to obtain refined pyrolysis gases 34A (or 34B) having a composition as indicated in Table 9.

TABLE 9

| Composition of refined gases | | | |
|---|---|---|---|
| $H_2$ | 17.3 vol. % | $C_4H_8$ | <0.1 vol.% |
| CO | 34.6 vol. % | $C_4H_{10}$ | 1.5 vol. % |
| $CO_2$ | 18.3 vol. % | $N_2$ | 3.0 vol. % |
| $CH_4$ | 15.0 vol. % | $H_2S$ | 0.3 vol. % |
| $C_2H_4$ | <0.1 vol. % | R—SH | <1 ppm |
| $C_2H_6$ | 8.1 vol. % | HCl | 0.1 vol.% |
| $C_3H_6$ | <0.1 vol. % | RCl | <1 ppm |
| $C_3H_8$ | 1.8 vol. % | | |

Since the hydrogenation caused considerable heat generation, a coolant 33 was used for heat removal. In this case, a part of the refined gases 42 may also be sent to the reforming tower 32A (or 32B) for dilution to reduce heat generation.

The refined gases 34A (or 34B) were passed to a dechlorinating tower 35 where the HCl contained in the gases was contacted with a $CaCO_3$ slurry 38 to be absorbed therein for removal from the gases. The thus dechlorinated gases 40 were passed through a desulfurizing ($H_2S$-absorbing) tower 41 to be contacted with MEA (monoethanolamine) 58 therein for removal of the $H_2S$ thereby to obtain further refined (HCl- and $H_2S$-free) gases 42 having a composition as shown in Table 10.

The thus obtained further refined gases 42 were preheated to 300° C. by a heater 43 and passed to an adsorbing tower 44 (packed with a layer of adsorption refining catalysts which were alumina and zinc oxide in this Example) to obtain still further refined gases 45 which were incorporated with steam 46 in a ratio by volume of 1:1 and then passed to a reforming tower 47A (this tower being used as the low-temperature steam reforming tower packed with a Ni-MgO-$Al_2O_3$ catalyst in this Example). The steam-incorporated gases were reformed with the steam at 400° C. and 15 Kg/cm²G and at a SV of 4000 HR$^{-1}$ to obtain reformed gases having a composition as shown in Table 10.

TABLE 10

| Composition | Further refined gases | Reformed gases |
|---|---|---|
| $H_2$ | 18.1 vol. % | 6.4 vol. % |
| CO | 36.2 | 0.4 |
| $CO_2$ | 14.9 | 40.8 |
| $CH_4$ | 15.7 | 49.5 |
| $C_2H_4$ | <0.1 | — |
| $C_2H_6$ | 8.5 | — |
| $C_3H_6$ | <0.1 | — |
| $C_3H_8$ | 1.9 | — |
| $C_4H_8$ | <0.1 | — |
| $C_4H_{10}$ | 1.6 | — |
| $N_2$ | 3.1 | 2.9 |
| $H_2S$ | 5-10 ppm | — |
| R—SH | <1 ppm * | — |
| HCl | 5-10 ppm | — |
| R—Cl | <1 ppm | — |

*These impurities could not be detected at the outlet of the adsorption refining catalyst layer.

The thus obtained reformed gases 49 were passed to an absorbing tower 62 to remove the $CO_2$ therefrom thereby to obtain final gases 63. The thus obtained final gases consisted of, by volume, 83.6% of $CH_4$, 10.8% of $H_2$, 0.7% of CO and 4.9% of $N_2$ and had a calorific value of 8310 Kcal/Nm³.

EXAMPLE 4

Figure 2:
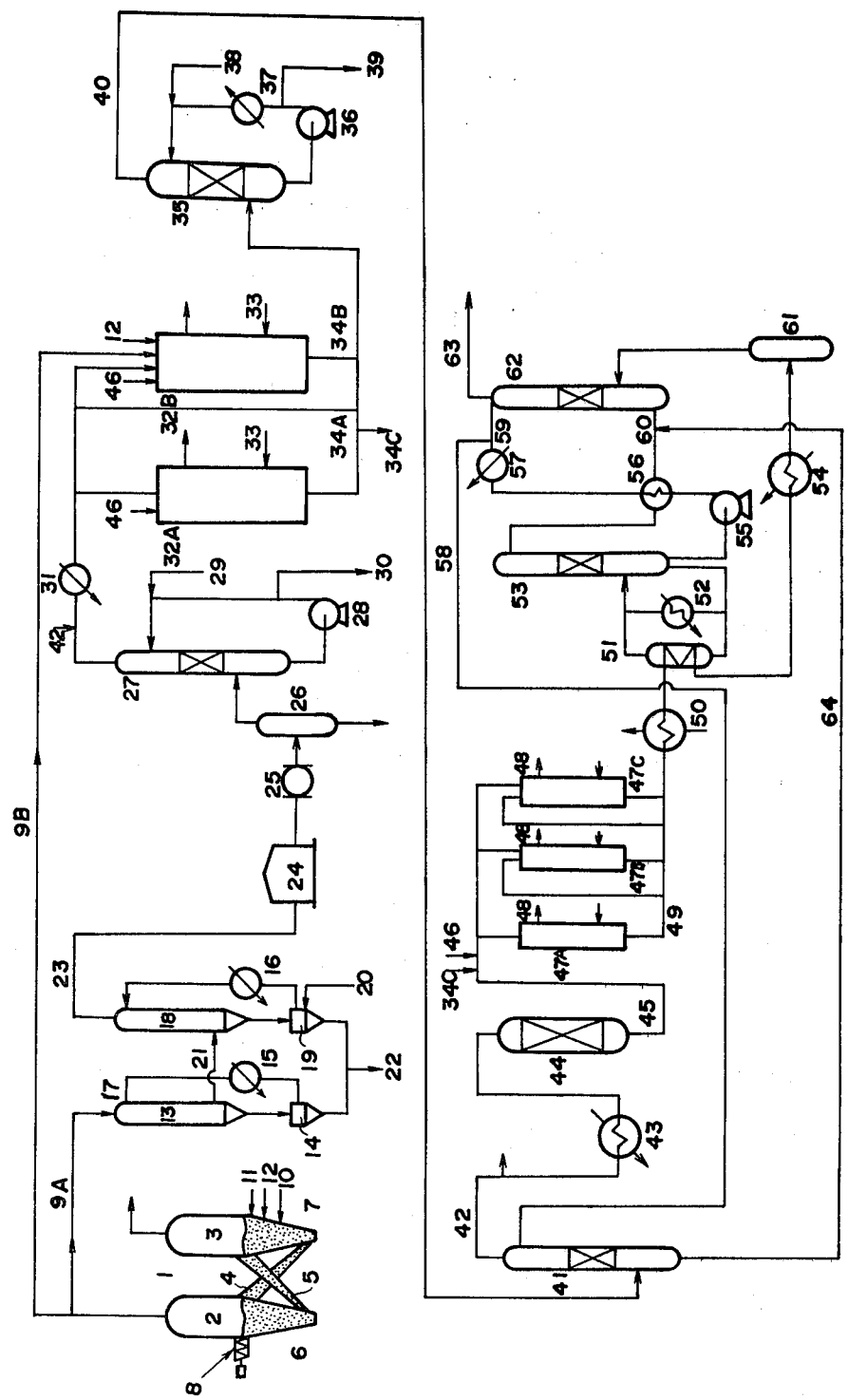
FIG. 2 is a schematic representation of the disclosed process.

The further refined gases 42 obtained in Example 3 were incorporated with steam 46 in a ratio by volume of 1:1 and then passed to a reforming tower 47B (this tower being used for the CO conversion in this Example) packed with an iron-based high-temperature CO conversion catalyst (FIG. 2). The CO conversion reaction was carried out at 400° C. and 15 Kg/cm²G to obtain reformed gases as the final gases having a composition as shown in Table 11.

TABLE 11

| Composition of final gases | | | |
|---|---|---|---|
| $H_2$ | 38.2 vol. % | $C_3H_6$ | <0.1 vol. % |
| CO | 2.8 vol. % | $C_3H_8$ | 1.4 vol. % |
| $CO_2$ | 35.7 vol. % | $C_4H_8$ | <0.1 vol. % |
| $CH_4$ | 11.8 vol. % | $C_4H_{10}$ | 1.2 vol. % |
| $C_2H_4$ | <0.1 vol. % | $N_2$ | 2.3 vol. % |
| $C_2H_6$ | 6.4 vol. % | | |

EXAMPLE 5

With reference to FIG. 2, in the same manner as in Example 3, the washed pyrolysis gases having the composition shown in Table 8 in Example 3, were stored in the gas holder 24, pressurized by the compressor 25 and then passed through the buffer drum 26 to the oil washing tower 27 where they were washed with kerosene 29. The oil-washed gases were preheated by the heater 31, incorporated with steam in a ratio by volume of 1:1.5 between the gases and steam and then passed to the refining tower 32A (or 32B) (this tower being used as the hydrogenating or hydrofining tower in this Example) packed with a sulfur-resistant CO conversion catalyst (cobalt.molybdenum-based), at a SV of 2000 HR$^{-1}$. The hydrogenation was effected at 420° C. and 15 Kg/cm²G in the hydrogenating tower thereby to obtain final gases which were refined gases having a composition as indicated in Table 12. It is seen from Table 12 that CO conversion and hydrogenation took place at the same time by the use of the CO conversion catalyst (cobalt.molybdenum-based) in the hydrogenating tower.

TABLE 12

| Composition of final gases | | | |
|---|---|---|---|
| $H_2$ | 37.4 vol. % | $C_4H_8$ | <0.1 vol. % |
| CO | 1.9 vol. % | $C_4H_{10}$ | 1.1 vol. % |
| $CO_2$ | 38.2 vol. % | $N_2$ | 2.3 vol. % |
| $CH_4$ | 11.4 vol. % | $H_2S$ | * |
| $C_2H_4$ | <0.1 vol. % | R—SH | <1 ppm |
| $C_2H_6$ | 6.1 vol. % | R—Cl | <1 ppm |
| $C_3H_6$ | <0.1 vol. % | HCl | * |
| $C_3H_8$ | 1.4 vol. % | | |

*Since the $H_2S$ and HCl were dissolved in the condensate of the excess steam, they were neutralized to be removed.

EXAMPLE 6

In cases where gases produced by the pyrolysis of solid wastes having a high calorific value as indicated in Table 13 were used as the starting pyrolysis gases, they were obtained as washed gases having the composition shown in Table 14 at the outlet of the oil washing tower.

TABLE 13

| Composition of solid wastes | |
|---|---|
| Paper-wood | 17.3 wt. % |
| Plastics | 41.3 wt. % |
| Rubber and leather | 2.8 wt. % |
| Metals | 6.3 wt. % |
| Glass | 13.6 wt. % |
| Mud, sand, etc. | 18.7 wt. % |
| Total | 100.0 wt. % |
| Lower calorific value 3,430 Kcal/kg | |

TABLE 14

| Composition of oil-washed pyrolysis gases | | | |
|---|---|---|---|
| $H_2$ | 15.00 vol. % | $C_3H_8$ | — |
| CO | 17.76 vol. % | $C_4H_8$ | 2.30 vol. % |
| $CO_2$ | 8.66 vol. % | $C_4H_{10}$ | 0.20 vol. % |
| $CH_4$ | 28.62 vol. % | $N_2$ | 3.58 vol. % |
| $C_2H_4$ | 14.18 vol. % | $H_2S$ | 0.26 vol. % |
| $C_2H_6$ | 3.51 vol. % | R—Cl | 0.10 vol. % |
| $C_3H_6$ | 5.73 vol. % | R—S | 0.10 vol. % |
| | | Total | 100.00 vol. % |

The thus obtained washed gases contained olefins in a very large proportion and, therefore, the amount of hydrogen contained in the washed gases was insufficient for hydrogenation. For this reason, the washed gases were incorporated with a part of the hydrogen-rich final gases (Table 15) described later as a recycled gas for hydrogenation in an amount by volume of 10% of the washed gases and then passed to the refining tower 32A (32B) which was used as the hydrogenating tower in this Example. The resulting hydrogenated gases 34A (or 34B) from the hydrogenating tower were passed to the dechlorinating tower 35 to contact the gases with the $CaCO_3$ slurry 38 for removal of the HCl and then passed to the wet type desulfurizing tower 41 using therein sodium 1-4-naphthoquinone-2-sulfonate as the redox catalyst to absorb and remove the $H_2S$ thereby obtaining further refined gases 42. The further refined gases so obtained were passed to the absorbing tower 44 (alumina and zinc oxide) to adsorb and remove the still remaining HCl and $H_2S$ therefrom thereby obtaining still further refined gases. The thus obtained still further refined gases were incorporated with steam in a ratio by volume of 1:4 between the gases and steam, passed to the reforming tower 47A packed with a Ni-$SiO_2$ catalyst (this tower being used as the steam reforming tower) where they were subjected to high-temperature steam reforming at 750° C. and 8 Kg/cm²G to obtain reformed gases 49 which were cooled to 350° C. and then passed to a CO conversion tower 47B thereby obtaining reformed gases as the final gases having a composition as shown in Table 15.

TABLE 15

| Composition of final gases | |
|---|---|
| $H_2$ | 70.1 vol. % |
| CO | 1.0 |
| $CO_2$ | 24.8 |
| $CH_4$ | 3.2 |
| $N_2$ | 0.9 |
| Total | 100.0 |

EXAMPLE 7

Referring to FIG. 2, urban solid wastes having a composition as shown in Table 16 were supplied through a line 8 to the pyrolyzing furnace 2 of the dual fluidized-bed pyrolyzing furnace 1 (indirect heating system) to pyrolyze therein the wastes at 680°–730° C. thereby to obtain pyrolysis gases which were then passed through the line 9A to the subsequent washing step.

TABLE 16

| Composition of urban solid wastes | |
|---|---|
| Wood chips | 3.3 wt. % |
| Fibers | 3.1 wt. % |
| Paper | 35.2 wt. % |
| Rubbish | 36.3 wt. % |
| Plastics | 19.2 wt. % |
| Metals | 2.1 wt. % |
| Glass and sand | 0.7 wt. % |
| Leather and rubber | 0.1 wt. % |
| Total | 100.0 wt. % |

The pyrolysis gases from the line 9A were washed in the scrubbers 13 and 18 and passed to the gas holder 24 for storage. The thus washed pyrolysis gases had a composition as shown in Table 17.

TABLE 17

| Composition of washed pyrolysis gases | | | |
|---|---|---|---|
| $H_2$ | 24.6 vol. % | $C_4H_{10}$ | 0.4 vol. % |
| CO | 31.2 vol. % | $C_5$ | 0.2 vol. % |
| $CO_2$ | 16.6 vol. % | Dienes & acetylene | 0.6 vol. % |
| $CH_4$ | 13.6 vol. % | $N_2$ | 2.5 vol. % |
| $C_2H_4$ | 6.4 vol. % | $H_2S$ | 0.2 vol. % |
| $C_2H_6$ | 0.9 vol. % | R—SH | 0.1 vol. % |
| $C_3H_6$ | 1.6 vol. % | HCl | <0.01 vol. % |
| $C_3H_8$ | 0.1 vol. % | R—Cl | 0.2 vol. % |
| $C_4H_8$ | 0.8 vol. % | | |

The washed pyrolysis gases stored in the gas holder were pressurized by the compressor 25, further washed in the oil washing tower 27, preheated by the heater 31 and then hydrogenated in the first refining tower (this tower being used as the first hydrogenating tower in this Example) 32A packed with a hydrofining catalyst (palladium catalyst). The washed gases were hydrogenated at 140° C. and 10 atm. (10.3 Kg/cm²) and at a SV of 1000 HR$^{-1}$ (The reaction rate was low at 80°–120° C., however, the hydrogenation of the dienes and acetylene was abruptly remarkable when the temperature was raised to said 140° C.). The gases so hydrogenated had a composition as shown in Table 18 (B). Table 18 (A) indicates the composition of gases obtained by desulfurizing the same washed pyrolysis gases to remove hydrogen sulfide ($H_2S$) therefrom and then hydrogenating the thus desulfurized gases in the first hydrogenating tower at a temperature of 80° C. It is seen from this Table that the dienes and acetylene contained in the gases desulfurized prior to hydrogenation could be hydrogenated at a lower temperature than those contained in the gases which had not desulfurized prior to hydrogenation.

TABLE 18

Composition of the gases from the first hydrogenating tower

| | (A) Hydrogenated at 80° C. after desulfurization | (B) Hydrogenated at 140° C. |
|---|---|---|
| $H_2$ | 23.8 vol. % | 16.9 vol. % |
| CO | 31.7 vol. % | 34.5 vol. % |
| $CO_2$ | 16.9 vol. % | 18.3 vol. % |
| $CH_4$ | 13.6 vol. % | 15.0 vol. % |
| $C_2H_4$ | 6.2 vol. % | 0.1 vol. % |
| $C_2H_6$ | 1.2 vol. % | 8.0 vol. % |
| $C_3H_6$ | 1.5 vol. % | <0.1 vol. % |
| $C_3H_8$ | 0.3 vol. % | 1.9 vol. % |
| $C_4H_8$ | 0.7 vol. % | <0.1 vol. % |
| $C_4H_{10}$ | 0.5 vol. % | 1.3 vol. % |
| $C_5$ | 0.6 vol. % | 0.7 vol. % |
| Dienes and acetylene | <0.01 vol. % | <0.01 vol. % |
| $N_2$ | 2.5 vol. % | 2.8 vol. % |
| $H_2S$ | <0.01 vol. % | 0.2 vol. % |
| R—SH | 0.1 vol. % | 0.1 vol. % |
| HCl | 0.1 vol. % | 0.1 vol. % |
| R—Cl | 0.1 vol. % | 0.1 vol. % |
| Total | 100.0 vol. % | 100.0 vol. % |

The gases having the composition (B) (the dienes and acetylene having been lessened) shown in Table 18 were preheated by a heater (not shown) and then hydrogenated or hydrofined in the second refining tower 32B, that is the second hydrogenating tower in this Example, packed with a nickel.molybdenum catalyst. Said gases were hydrogenated at 350° C. and 10 atm. (10.3 Kg/cm$^2$) and at a SV of 2000 HR$^{-1}$ in the second hydrogenating tower to obtain refined gases. In this hydrogenation, hydrogenation of the organochloric compounds, organosulfuric compounds and olefins proceeded.

The refined gases from the second hydrogenating tower 32B were passed to the dechlorinating tower 35 where they were contacted with a slurry of $CaCO_3$ to remove the HCl therefrom, and then passed to the desulfurizing tower 41 where they were contacted with monoethanolamine (MEA) to remove the $H_2S$ therefrom thereby obtaining further refined gases 42 having a composition as shown in Table 19.

TABLE 19

Composition of further refined gases

| $H_2$ | 16.8 vol. % | $C_4H_{10}$ | 1.3 vol. % |
|---|---|---|---|
| CO | 34.4 vol. % | $C_5H_{12}$ | 0.7 vol. % |
| $CO_2$ | 18.7 vol. % | Dienes and acetylene | 0 vol. % |
| $CH_4$ | 15.2 vol. % | $N_2$ | 2.8 vol. % |
| $C_2H_4$ | 0 vol. % | $H_2S$ | — |
| $C_2H_6$ | 8.2 vol. % | R—SH | — |
| $C_3H_6$ | 0 vol. % | HCl | — |
| $C_3H_8$ | 2.0 vol. % | R—Cl | — |
| $C_4H_8$ | 0 vol. % | | |
| | | Total | 100.0 vol. % |

EXAMPLE 8

The further refined gases 42 (Table 19) as obtained in Example 7 were incorporated with steam in a ratio by volume of 1:1, passed to the reforming tower 47A (this tower being used as the low-temperature steam reforming tower packed with a Ni-MgO-Al$_2$O$_3$ catalyst) where they were reformed with steam at a SV of 3000 HR$^{-1}$ and at 500° C. and 9 atm. (9.3 Kg/cm$^2$), and then passed to a reforming tower 47C (this tower being used as the methanation tower packed with a Ni catalyst in this Example) where they were subjected to methanation at a SV of 3000 HR$^{-1}$ at 350° C. and 8 atm. (8.2 Kg/cm$^2$). The methanated gases from the methanating tower 47C were cooled to condense and remove the excess steam therefrom thereby obtaining gases having a composition as shown in Table 20 (A). The gases so obtained were freed of the $CO_2$ thereby to obtain final gases having a composition as shown in Table 20 (B).

TABLE 20

| | (A) | (B) |
|---|---|---|
| $CH_4$ | 49.1 vol. % | 86.1 vol. % |
| $H_2$ | 5.2 vol. % | 9.1 vol. % |
| CO | 0.1 vol. % | 0.2 vol. % |
| $CO_2$ | 43.0 vol. % | 0 vol. % |
| $N_2$ | 2.6 vol. % | 4.6 vol. % |
| Total | 100.0 vol. % | 100.0 vol. % |
| Calorific value | 4836 Kcal/Nm$^3$ | 8530 Kcal/Nm$^3$ |

EXAMPLE 9

The further refined gases 42 (Table 19) as obtained in Example 7 were incorporated with steam 46 in a ratio by volume of 1:3 between the refined gases and steam, passed to the reforming tower 47B (this tower being used as the CO conversion tower packed with a Fe-Cr catalyst in this Example) where the steam-incorporated gases were subjected to CO conversion at a SV of 3000 HR$^{-1}$ at 450° C. and 9 atm. (9.3 Kg/cm$^2$), and then passed to the reforming tower 47C (this tower being used as the methanating tower packed with a Ni-MgO catalyst) where the thus CO-converted gases were subjected to methanation at a SV of 3000 HR$^{-1}$ and at 330° C. and 8 atm. (8.2 Kg/cm$^2$). The thus methanated gases were cooled to condense and remove the excess steam thereby obtaining gases having a composition as shown in Table 22 (A). The gases so obtained were freed of the $CO_2$ to obtain final gases having a composition as shown in Table 22 (B).

TABLE 22

| | (A) | (B) |
|---|---|---|
| $CH_4$ | 47.9 vol. % | 83.2 vol. % |
| $H_2$ | 7.1 vol. % | 12.3 vol. % |
| CO | 0.1< vol. % | 0.1 vol. % |
| $CO_2$ | 42.4 vol. % | 0 vol. % |
| $N_2$ | 2.6 vol. % | 4.4 vol. % |
| Total | 100.0 vol. % | 100.0 vol. % |
| Calorific value | 4777 Kcal/Nm$^3$ | 8300 Kcal/Nm$^3$ |

EXAMPLE 10

(Continuous type high-temperature refining and reforming method)

The same starting pyrolysis gases as used in Example 7 which were obtained by pyrolyzing the same urban solid wastes as indicated in Table 16 under the same pyrolyzing conditions as used in Example 7, soon after which they were passed through a line 9B to the refining tower 32B (this tower packed with a Ni-CaO-SiO$_2$ catalyst being used as the refining and reforming tower in this Example) where they were subjected to continuous high-temperature steam reforming at a SV of 2000 HR$^{-1}$ and at 800°-830° C. and atmospheric pressure.

The gases so refined and reformed were then cooled to condense and remove the excess steam therefrom thereby obtaining refined and reformed gases having a composition as shown in Table 23.

TABLE 23

| Composition of refined and reformed gases | |
| --- | --- |
| $CH_4$ | 0.1 vol. % |
| $H_2$ | 62.9 vol. % |
| CO | 15.0 vol. % |
| $CO_2$ | 21.0 vol. % |
| $N_2$ | 1.0 vol. % |
| Total | 100.0 vol. % |
| Calorific value | 2380 $Kcal/Nm^3$ |

Note: 100 ppm of HCl and 2000 ppm of $H_2S$ were detected in the above refined and reformed gases.

Said gases were passed to the dechlorinating tower 35 and the desulfurizing tower 41 to absorb and remove the HCl and $H_2S$ therefrom respectively and then passed through the adsorbing tower 44 packed with zinc oxide (ZnO) and alumina ($Al_2O_3$), thereby obtaining still further refined gases 45. The still further refined gases so obtained were incorporated with steam 46 in a ratio by volume of 1:5 between the gases and steam and passed to a reforming tower 47C (this tower packed with a $Ni-Al_2O_3$ catalyst being used as the methanating tower in this Example) where they were subjected to methanation at a SV of 3000 $HR^{-1}$ and at 350° C. and atmospheric pressure, thereby obtaining methanated gases. The gases so methanated were cooled to condense and remove the excess steam therefrom thereby to obtain gases having a composition as shown in Table 24 which were further freed of the carbonic acid gas by absorption thus obtaining gases having a composition as shown in Table 25.

TABLE 24

| Steam-free methanated gases | |
| --- | --- |
| $CH_4$ | 45.9 vol. % |
| $H_2$ | 8.9 vol. % |
| CO | 0.0 vol. % |
| | (less than 0.1) |
| $CO_2$ | 42.5 vol. % |
| $N_2$ | 2.7 vol. % |
| Total | 100.0 vol. % |
| Calorific value | 4641 $Kcal/Nm^3$ |

TABLE 25

| Carbonic acid gas-free gases | |
| --- | --- |
| $CH_4$ | 79.8 vol. % |
| $H_2$ | 15.5 vol. % |
| $CO_2$ | 0.0 vol. % |
| | (less than 0.1) |
| $N_2$ | 4.7 vol. % |
| Total | 100.0 vol. % |
| Calorific value | 8070 $Kcal/Nm^3$ |

EXAMPLE 11

(Cyclic type high-temperature refining and reforming method)

The same starting pyrolysis gases as used in Example 7, produced by pyrolyzing the urban solid wastes (Table 16) at 680°-730° C. in the same pyrolyzing furnace as used in Example 7, were supplied to the refining tower 32B (this tower packed with a $Ni-MgO-SiO_2$ catalyst being used as the refining and reforming tower in this Example) after the catalyst layer therein had been heated to 830°-850° C. by supplying fuel, air and steam to the tower 32B. The reaction was carried out at a SV of 2000 $HR^{-1}$ and at atmospheric pressure in the tower. The gases so reacted were cooled to condense and remove the excess steam therefrom thereby obtaining hydrofined and reformed gases having a composition as shown in Table 26. Since the organochloric compounds and organosulfuric compounds ran out when the temperature of the catalyst layer lowered to about 750° C., the supply of the pyrolysis gases was stopped and, insteads, fuel, air and steam were again supplied to heat the catalyst layer to 830°-850° C. When the reaction was again carried out, the same gases as those indicated in Table 26 were obtained.

TABLE 26

| Composition of refined and reformed gases | |
| --- | --- |
| $CH_4$ | 0.05 vol. % |
| $H_2$ | 62.91 vol. % |
| CO | 15.24 vol. % |
| $CO_2$ | 20.75 vol. % |
| $N_2$ | 1.10 vol. % |
| Total | 100.00 vol. % |
| Calorific value | 2380 $Kcal/Nm^3$ |

Note: 100 ppm of HCl and 2000 ppm of $H_2S$ were detected in the above refined and reformed gases.

These refined and reformed gases from the tower 32B were passed to the dechlorinating tower 35 where the HCl was absorbed and removed from the gases, passed to the desulfurizing tower 41 where the $H_2S$ was absorbed and removed from the gases, and then passed through the adsorbing tower 44 packed with zinc oxide (ZnO) and alumina ($Al_2O_3$), to obtain still further refined gases. The thus obtained still further refined gases were incorporated with steam 46 in a ratio by volume of 1:5 between the gases and steam and then introduced into the reforming tower 47C (this tower being used as the methanating tower packed with a $Ni-Al_2O_3$ catalyst in this Example) where the steam-incorporated gases were subjected to methanation at a SV of 3000 $HR^{-1}$ and at 350° C. and atmospheric pressure. The gases so methanated were cooled to condense and remove the excess steam therefrom thereby to obtain gases having a composition as shown in Table 27. The thus obtained gases were further freed of the carbonic acid gas by absorption for removal thereby to obtain gases having a composition as shown in table 28.

TABLE 27

| Composition of methanated gases | |
| --- | --- |
| $CH_4$ | 45.8 vol. % |
| $H_2O$ | 8.9 vol. % |
| CO | 0.0 vol. % |
| | (less than 0.1) |
| $CO_2$ | 42.6 vol. % |
| $N_2$ | 2.7 vol. % |
| Total | 100.0 vol. % |
| Calorific value | 4630 $Kcal/Nm^3$ |

TABLE 28

| Composition of $CO_2$—free gases | |
| --- | --- |
| $CH_4$ | 79.8 vol. % |
| $H_2$ | 15.5 vol. % |
| CO | 0.0 vol. % |
| $N_2$ | 4.7 vol. % |
| Total | 100.0 vol. % |
| Calorific value | 8070 $Kcal/Nm^3$ |

EXAMPLE 12

(Partial oxidation type high-temperature refining and reforming method)

The same starting pyrolysis gases as used in Example 7 were incorporated with oxygen in a ratio by volume of 20:1 between the pyrolysis gases and oxygen and reacted at a SV of 2000 $HR^{-1}$ and at 800°–830° C. and atmospheric pressure in the hydrofining tower 32B (this tower being used as the partial oxidation type hydrofining and reforming tower packed with a Ni-Mg-$SiO_2$ catalyst, into which oxygen was introduced through the line 12 instead of fuel) thereby to obtain hydrofined and reformed gases 34B which were cooled to condense and remove the excess steam thereby obtaining gases having a composition as indicated in Table 29.

TABLE 29

| Composition of refined and reformed gases | |
|---|---|
| $CH_4$ | 0.0 vol. % |
| $H_2$ | 57.4 vol. % |
| CO | 14.5 vol. % |
| $CO_2$ | 26.8 vol. % |
| $N_2$ | 1.3 vol. % |
| Total | 100.0 vol. % |
| Calorific value | 2188 Kcal/$Nm^3$ |

Note: 100 ppm of HCl and 2000 ppm of $H_2S$ were detected in the above hydrofined and reformed gases.

Said refined and reformed gases were passed to the dechlorinating tower 35 wherein the HCl was absorbed and removed from the gases, passed to the desulfurizing tower 41 wherein the $H_2S$ was absorbed and removed from the gases, and then passed through the adsorbing tower 44 packed with zinc oxide (ZnO) and alumina ($Al_2O_3$) thereby to obtain still further refined gases. The thus obtained still further refined gases were incorporated with steam 46 in a ratio by volume of 1:5 between the further refined gases and steam and then passed to the reforming tower 47C (this tower being used as the methanating tower packed with a Ni-MgO-$Al_2O_3$ catalyst in this Example) to react therein the steam-incorporated refined gases at a SV of 3000 $HR^{-1}$ and at 350° C. and atmospheric pressure thereby obtaining methanated gases from which the excess steam was condensed and removed to obtain gases as shown in Table 30. The thus obtained gases (Table 30) were treated so as to absorb and remove the carbonic acid gas therefrom thereby obtaining gases having a composition as shown in Table 31.

TABLE 30

| Composition of methanated gases | |
|---|---|
| $CH_4$ | 37.5 vol. % |
| $H_2$ | 7.1 vol. % |
| CO | 0.0 vol. % |
| $CO_2$ | 52.6 vol. % |
| $N_2$ | 2.8 vol. % |
| Total | 100.0 vol. % |
| Calorific value | 3787 Kcal/$Nm^3$ |

TABLE 31

| Composition of $CO_2$-free methanated gases | |
|---|---|
| $CH_4$ | 79.1 vol. % |
| $H_2$ | 15.1 vol. % |
| CO | 0.0 vol. % |
| $N_2$ | 5.8 vol. % |
| Total | 100.0 vol. % |
| Calorific value | 7990 Kcal/$Nm^3$ |

COMPARATIVE EXAMPLE 2

The same starting pyrolysis gases as used in Example 7 were introduced into an adiabatic reactor (not shown) packed with a steam reforming catalyst (Ni-MgO-$Al_2O_3$) to react them at a SV of 1000 $HR^{-1}$ and at atmospheric pressure, whereupon the temperature of the gases so reacted was 500°–550° C. at the outlet of the reactor. The thus reacted gases had a composition as shown in Table 32. However, the temperature of the outlet of the reactor was gradually raised, and organochloric compounds, organosulfuric compounds, $C_2$ and higher hydrocarbons came to be detected in the reacted gases.

TABLE 32

| Composition of reacted gases | |
|---|---|
| $CH_4$ | 4.4 vol. % |
| $H_2$ | 60.5 vol. % |
| CO | 5.2 vol. % |
| $CO_2$ | 28.7 vol. % |
| $N_2$ | 1.2 vol. % |
| Total | 100.0 vol. % |
| Calorific value | 2421 Kcal/$Nm^3$ |

What is claimed is:

1. A process for converting solid wastes to gases suitable for use as a town gas comprising the steps of:
    (1) pyrolyzing solid wastes at a temperature of at least 550° C. in a pyrolyzing furnace to produce pyrolysis gases containing hydrogen, carbon monoxide, carbonic acid gas, methane and other hydrocarbons, inert gases, chlorine-containing compounds, sulfur-containing compounds and other impurities,
    (2) washing the thus produced pyrolysis gases,
    (3) refining the thus washed pyrolysis gases,
    (4) reforming the thus refined pyrolysis gases with the steam contained therein by at least one member selected from low-temperature steam reforming, high-temperature steam reforming, CO conversion and methanation and
    (5) separating at least one member selected from the steam and carbonic acid gas from the thus reformed pyrolysis gases thereby to obtain the gases suitable for use as a town gas.

2. A process according to claim 1, wherein the refining (3) is effected by hydrogenating the washed pyrolysis gases with the hydrogen contained therein.

3. A process according to claim 1, wherein the refining (3) is effected by firstly hydrogenating the pyrolysis gases with the hydrogen contained therein at a low temperature of at least 120° C. and secondly hydrogenating the firstly hydrogenated pyrolysis gases therewith at a high temperature of 200°–500° C.

4. A process for converting solid wastes to gases suitable for use as a town gas comprising the steps of:
    (1) pyrolyzing solid wastes at a temperature of at least 550° in a pyrolyzing furnace to produce pyrolysis gases containing hydrogen, carbon monoxide, carbonic acid gas, methane and other hydrocarbons, inert gases, chlorine-containing compounds, sulfur-containing compounds and other impurities,
    (2) hydrofining and reforming the thus produced pyrolysis gases at a high temperature of the pyrolysis gases in hot state supplied directly from the pyrolyzing furnace,
    (3) washing the thus reformed pyrolysis gases with a chemical absorbent or adsorbent to remove from the gases the resulting HCl and H₂S contained therein.

(4) subjecting the thus washed pyrolysis gases to methanation, and (5) separating at least one member selected from the steam and carbonic acid gas from the methanated pyrolysis gases thereby to obtain the gases suitable for use as a town gas.

5. A process according to claim 1, wherein the refining (3) is effected by passing the washed pyrolysis gases through the layer of activated carbon for adsorbing high-boiling ingredients selected from C₃ or higher hydrocarbons contained in the gases and then passing the gases through the layer of activated carbon for adsorbing low-boiling ingredients selected from chlorine-containing compounds and sulfur-containing compounds contained in the gases.

6. A process according to any one of claims 1-3 and 5, wherein the washing (2) is effected with water, an aqueous alkaline solution or a condensate obtained by cooling the pyrolysis gases, by the use of at least one scrubber.

7. A process according to claim 1, wherein the refining (3) is effected by hydrogenating the washed pyrolysis gases with the hydrogen contained therein at 100°–500° C.

8. A process according to claim 3, wherein the first hydrogenation is carried out at 120-lower than 200° C. and the second hydrogenation at 200°–500° C.

9. A process according to claim 4, wherein the hydrofining and reforming are carried out by a member selected from continuous type, cyclic type and partial oxidation type high-temperature steam reforming methods.

10. A process according to claim 9 or 4, wherein the hydrofining and reforming are carried out with the hydrogen and steam contained in the pyrolysis gases.

11. A process according to any one of claims 9 or 4, wherein the hydrofining and reforming in the are carried out at a high temperature of 750°–850° C.

12. A process according to claim 1, wherein in the reforming step (4), the low-temperature steam reforming is carried out at 300°–600° C., the high-temperature steam reforming at 400°–850° C., the CO conversion at 200°–550° C. and the methanation at 250°–600° C.

13. A process according to claim 5, wherein the activated carbon for adsorbing the high-boiling ingredients is one having a cumulative pore volume of up to 0.3 cc/g and the activated carbon for adsorbing the low-boiling ingredients is one having a cumulative pore volume of at least 0.35 cc/g, the pores for the cumulative pore volume being those having a pore diameter of up to 15 Å as determined from the methanol adsorption method.

14. A process according to claim 10, wherein the hydrofining and reforming are carried out at a high temperature of 750°–850° C.

* * * * *